United States Patent [19]

Sugimoto

[11] 4,309,750

[45] Jan. 5, 1982

[54] INVERTER DEVICE

[75] Inventor: Hidehiko Sugimoto, Nagoya, Japan

[73] Assignee: Mitsubishi Denki Kabushiki Kaisha, Tokyo, Japan

[21] Appl. No.: 576

[22] Filed: Jan. 2, 1979

[30] Foreign Application Priority Data

Jan. 23, 1978 [JP] Japan ............................... 53-5944
Feb. 23, 1978 [JP] Japan ............................... 53-19999

[51] Int. Cl.³ ............................................ H02M 7/515
[52] U.S. Cl. ................................. 363/138; 363/124
[58] Field of Search ......................... 363/96–98, 363/124, 135–138; 307/252 M

[56] References Cited

U.S. PATENT DOCUMENTS

| | | | |
|---|---|---|---|
| 3,559,034 | 1/1971 | Jensen et al. | 363/135 |
| 3,895,274 | 7/1975 | Chin | 363/137 X |
| 4,019,117 | 4/1977 | Gehm et al. | 363/138 |
| 4,107,551 | 8/1978 | Akamatsu | 307/252 M X |
| 4,146,921 | 3/1979 | Akamatsu | 363/138 |

Primary Examiner—William M. Shoop
Assistant Examiner—Peter S. Wong
Attorney, Agent, or Firm—Oblon, Fisher, Spivak, McClelland & Maier

[57] ABSTRACT

Economical thyristors are used instead of expensive transistors and a transistor is used for extinction of the thyristors to reduce cost in an inverter device having an inverter function for converting DC to AC or a current type inverter device having a chopper function for controlling DC power and an inverter function for converting DC to AC.

15 Claims, 13 Drawing Figures

INVERTER DEVICE

BACKGROUND OF THE INVENTION

1. Field of the Invention

The present invention relates to an inverter device having an inverter function for converting DC to AC or a current type inverter device having a chopper function for controlling DC power and an inverter function for converting DC to AC. More particularly, it relates to an economical inverter device wherein economical thyristors are used instead of expensive transistors and a transistor is used for extinction of the thyristors.

2. Description of the Prior Arts

FIG. 1 shows the conventional inverter device wherein the reference (1) designates a DC power source; (2U+), (2V+), (2W+), (2U−), (2V−), (2W−) designate transistors; (3U+), (3V+), (3W+), (3U−), (3V−), (3W−) designate diodes. The pairs of the transistor (2U+) and the diode (3U+); transistor (2V+) and the diode (3V+); the transistor (2W+) and the diode (3W+); the transistor (2U−) and the diode (3U−); the transistor (2V−) and the diode (3V−); and the transistor (2W−) and the diode (3W−) are respectively connected in reverse parallel with each other. The pairs of the transistors (2U+), (2U−); the transistors (2V+), (2V−); and the transistors (2W+), (2W−) are respectively connected in series. Moreover, the collectors of the transistors (2U+), (2V+), (2W+) are connected to the positive side of the DC power source (1) and the emitters of the transistors (2U−), (2V−), (2W−) are connected to the negative side of the DC power source (1).

The reference (4) designates a load and three terminals (U), (V), (W) are respectively connected to the joint between the transistors (2U+), (2U−); the joint between the transistors (2V+), (2V−); and the joint between the transistors (2W+), (2W−). The bases of the transistors (2U+), (2V+), (2W+), (2U−), (2V−), (2W−) are connected to a base control device (5). The transistors are turned on by the base control device (5) for the periods shown in FIG. 2 wherein each shift of 120° is given between the transistors (2U+), (2V+), (2W+) and each shift of 180° is given between the transistors (2U+), (2U−) between the transistors (2V+), (2V−) and between the transistors (2W+), (2W−) to turn on these transistors by the base signals.

When the base signals are respectively inputted to the bases of the transistors in the conventional inverter device, the voltages shown in FIG. 3 are formed between the terminal (U), (V), (W) of the load (4). When the voltage of the DC power source (1) is given as Ed, the voltage "Ed" is applied between the terminals (U)–(V) and the voltage "−Ed" is applied between the terminals (V)–(W); and the voltage "Zero" is applied between the terminals (W)–(U) in the period (I) of FIG. 2 which corresponds to the period (I) of FIG. 3, since the transistors (2U+), (2W+), (2V−) are respectively in ON state.

The voltage "Ed" is applied between the terminals (U)–(V) and the voltage "Zero" is applied between the terminals (V)–(W); and the voltage "−Ed" is applied between the terminals (W)–(U) in the period (II) of FIG. 2 which corresponds to the period (II) of FIG. 3 since the transistors (2U+), (2V−), (2W−) are respectively in ON state. Thus, AC power source is fed from the DC power source (1) to the load (4).

Each of the diodes (3U+), (3V+), (3W+), (3U−), (3V−), (3W−) is used for passing the current passed by each of the transistors (2U+), (2V+), (2W+), (2U−), (2V−), (2W−) when each of these transistors is in OFF state. For example, when the transistor (2U+) is turned off, the current is passed by the diode (3U−). When the diode (3U−) is turned on, the potential of the terminal (U) of the load is the same with the potential in ON state of the transistor (2U−). Accordingly, the voltage waveform of FIG. 3 is not changed.

FIG. 4 shows the conventional current type inverter device wherein the reference (11) designates a DC power source; (12) designates a chopper connected to the DC power source (11); (13+), (13−) designate DC reactors connected to the chopper (12); (14) designates an inverter connected to the DC reactors (13+), (13−) and the DC power source (11); (15) designates a load connected to the inverter (14). The chopper (12) is formed with transistors (101) (102) for chopper function and diodes (103), (104). The inverter (14) is formed with transistors (105) to (110) and diodes (111) to (116). The reference (16) designates a control device for controlling bases of the transistors (101), (102), (105) to (110).

The operation of the current type inverter device will be illustrated.

The chopper (12) is to control DC power fed from the DC power source (11) through the DC reactors (13+), (13−) to the inverter (14). When ON signal is input from the control device (16) to the bases of the transistors (101), (102), the power is fed from the DC power source (11) through the transistors (101), (102) to the inverter (14). When OFF signal is input from the control device (16) to the bases of the transistors (101), (102), the transistors are tuned off to feed-back the power from the inverter (14) through the diodes (103), (104) to the DC power source (11). Thus, the chopper (12) controls the power fed from the DC power source (11) to the inverter (14) by controlling ON and OFF of the transistors (101), (102). The reactors (13+), (13−) operate to smoothen the feeding of the power.

The DC power fed from the chopper (12) through the DC reactor (13+), (13−) is converted by the inverter (14) into AC power to feed it to the load (15). The ON-OFF signal shown in FIG. 5 is input from the control device (16) to the bases of the transistors (105) to (110). In the mode (I) wherein the ON signal inputs the bases of the transistors (105), (110) and the OFF signal inputs the bases of the other transistors (101), (107), (108), (109), the DC power is fed through the DC resistor (13+), the transistor (105), the load (15), the transistor (110) and the DC reactor (13−). When it is changed from the mode (I) to the mode (II), the base signal of the transistor (105) is switched from ON signal to OFF signal and the base signal of the transistor (107) is switched from OFF signal to ON signal. In this condition, when a reactor component is included in the load (15), the current passing through the transistor (105) is passed from the negative side of the DC power source (11) through the diode (112), and the current is gradually reduced, whereas the current passing from the DC reactor (13+) through the transistor (107) to the load (15) is gradually increased. The current passing to the DC reactor (13+) can be maintained substantially constant. When the current passing from the transistor (107) to the load (15) is less than the current of the DC reactor (13+), the current is passed through the DC reactor (13+), the transistor (107), the diode (113) and the transistor (101) or through the DC reactor (13+), the transistor (107), the diode (113), the DC power source (11) and the diode (103) depending upon the condition of the chopper (12). The current passing through the transistor (110) is not changed. When the current passing through the diode (103) is zero and the current passing through the transistor (107) is the same with the current passing through the DC reactor (13+), the current is passed through the DC reactor (13+), the transistor (107), the load (15), the transistor (110) and the DC reactor (13−).

Thus, the transistors (105) to (110) and the diodes (111) to (116) in the inverter (14) are sequentially and repeatedly turned on and off to feed AC power to the load (15).

In the conventional inverter device or the conventional current type inverter device, many transistors are used as switching elements. The transistors are remarkably expensive in comparision with thyristors (SCR) used as switching element (the same current capacity).

However, the thyristors are not in OFF state even though the current to the gate is stopped, and accordingly the normal operation can not be expected only by replacing the transistors with thyristors and it is necessary to connect a complicated and expensive commutation circuit when the thyristors are used instead of the transistors.

SUMMARY OF THE INVENTION

It is an object of the present invention to provide an economical inverter device wherein economical thyristors are used instead of expensive transistors and a transistor is used for extinction of the thyristors to reduce a cost.

DETAILED DESCRIPTION OF THE PREFERRED EMBODIMENTS

Figure 6:
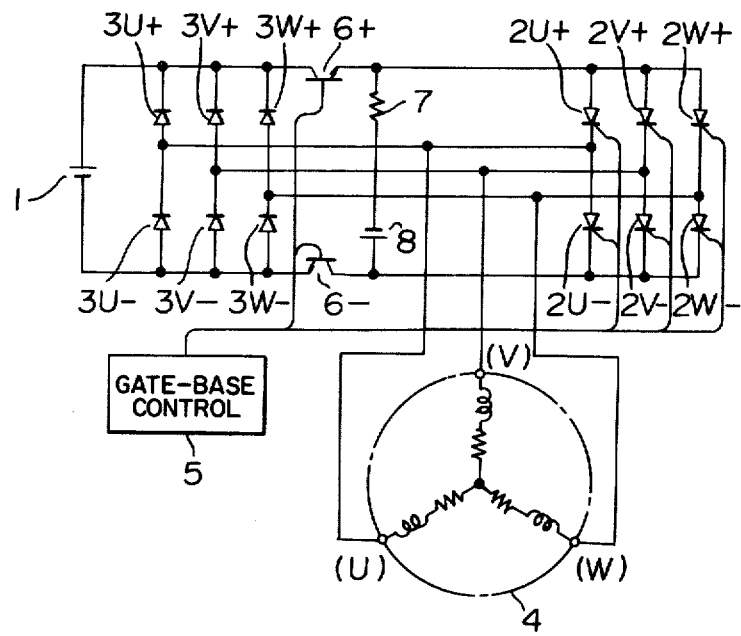
FIG. 6 is a circuit diagram of one embodiment of an inverter device according to the present invention.

FIG. 6 shows one embodiment of the present invention wherein the reference (1) designates a first DC power source having a voltage $E_d$; (2U+), (2V+), (2W+), (2U−), (2V−), (2W−) respectively designate thyristors; (3U+), (3V+), (3W+), (3U−), (3V−), (3W−) respectively designate diodes; (4) designates a load; (5) designates a gate-base control device; (6+), (6−) respectively designate transistors; (7) designates a resistor and (8) designates a second DC power source.

The thyristors (2U+) and (2U−); (2V+) and (2V−); (2W+) and (2W−) are respectively connected in series. The anodes of the thyristors (2U+) and (2V+), (2W+) are respectively connected through the transistor (6+) to a positive side of the first DC power source (1). On the other hand, the cathodes of the thyristors (2U−), (2V−), (2W−) are respectively connected through a transistor (6−) to the negative side of the first DC power source (1).

On the other hand, the diodes (3U+), (3U−) are respectively connected in series and the joint is connected to the joint between the thyristors (2U+), (2U−) and the joint of the load (4).

The diodes (3V+), (3V−) are respectively connected in series and the joint is connected to the joint between the thyristors (2V+), (2V−) and the joint of the terminal (V) of the load (4).

The diodes (3W+), (3W−) are respectively connected in series and the joint is connected to the joint between the thyristors (2W+), (2W−) and the terminal (W) of the load (4).

Moreover, the cathodes of the diodes (3U+), (3V+), (3W+) are connected to the positive side of the first DC power source (1). The anodes of the diodes (3U−), (3V−), (3W−) are connected to the negative side of the first DC power source (1).

The positive side of the second DC power source (8) connected in series to the resistor (7) is connected to the cathode of the thyristors (2U−), (2V−), (2W−). The other end of the resistor (7) is connected to the anodes of the thyristors (2U+), (2V+), (2W+).

Figure 7:
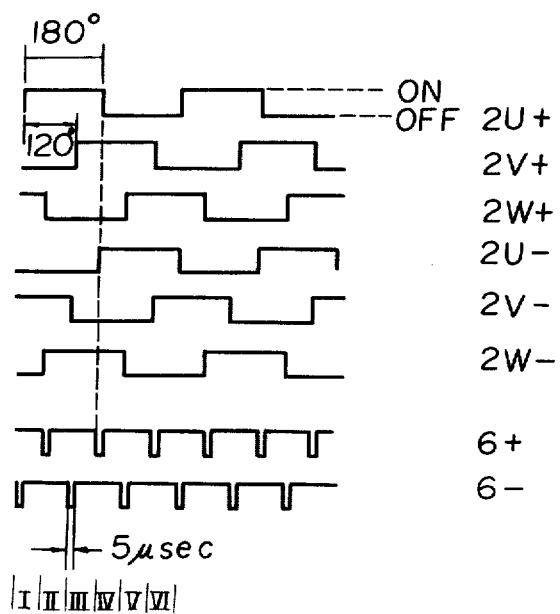
FIG. 7 shows input signal waveforms of a gate of a thyristor and a base of a transistor in the inverter device according to the present invention.

The inverter device of the present invention has the abovementioned structure. The signal shown in FIG. 7 is input from the base control device (5) to the thyristors (2U+), (2V+), (2W+), (2U−), (2V−), (2W−) and the transistors (6+), (6−). The signals having each shift of 120° are respectively input to the thyristors (2U+), (2V+), (2W+) and the signals having each shift of 180° are respectively input to pairs of the thyristors (2U+) and (2U−); (2V+) and (2V−); (2W+) and (2W−). The width of the signal is 180°. Thus, the signal for disappearing for 50µ sec. at the time disappearing the input signals of the thyristors (2U+), (2V+), (2W+) is input to the transistor (6+) and the signal for disappearing for 50µ sec. at the time disappearing the input signals of the thyristors (2U−), (2V−), (2W−) is input to the transistor (6−).

The turn-off of the thyristor will be performed as follows.

In FIG. 6, the gate signal of the thyristor is stopped and simultaneously the base signal of the transistor (6+) is stopped for turning off the thyristor (2U+).

At this time, the transistor (6+) is immediately turned off and the current passing through the thyristor (2U+) becomes zero.

However, the turn-of time for maintaining OFF function takes a long time when a reverse voltage is not applied even though the current of the thyristor is zero. The reverse voltage is applied by a second DC power source (8).

That is, the voltage of the second DC power source (8) is applied from the positive side through the transistor (6−) and the diode (3U−), to the cathode of the thyristor (2U+) and from the negative side of the second DC power source (8) through the resistor (7) to the anode of the thyristor (2U+). In the current passage, a reverse voltage is applied to the thyristor (2U+). Since no current is passed, there is no trouble to apply the reverse voltage even though the resistance of the resistor (7) is increased. Incidentally, the voltage of the second DC power source (8) is preferably about 10 Volt. The resistance of the resistor (7) is preferably about several hundreds Ω since the voltages of the first and second DC power sources (1), (8) are applied to the resistor (7) when both of the transistors (6+), (6−) are in ON state.

Figure 1:
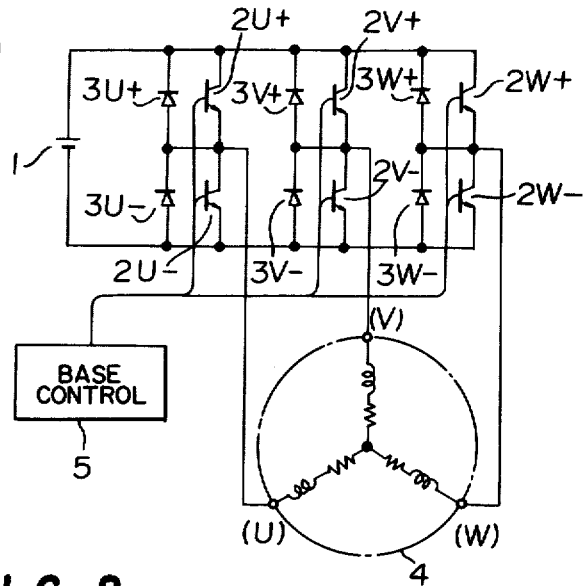
FIG. 1 is a circuit diagram of the conventional inverter device.
Figure 2:
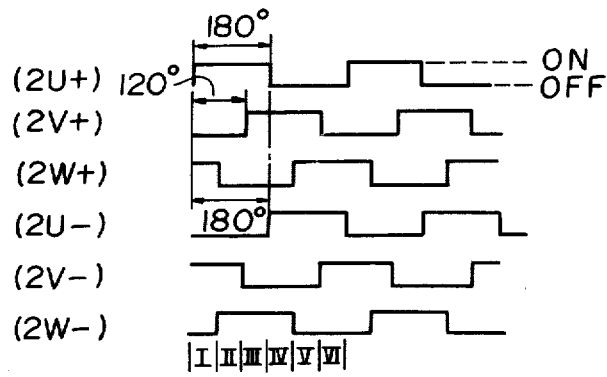
FIG. 2 shows base input signal waveforms of a transistor in the conventional inverter device.
Figure 3:
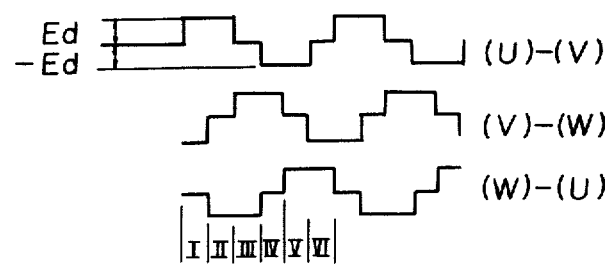
FIG. 3 shows output voltage waveforms of the conventional inverter device.
Figure 4:
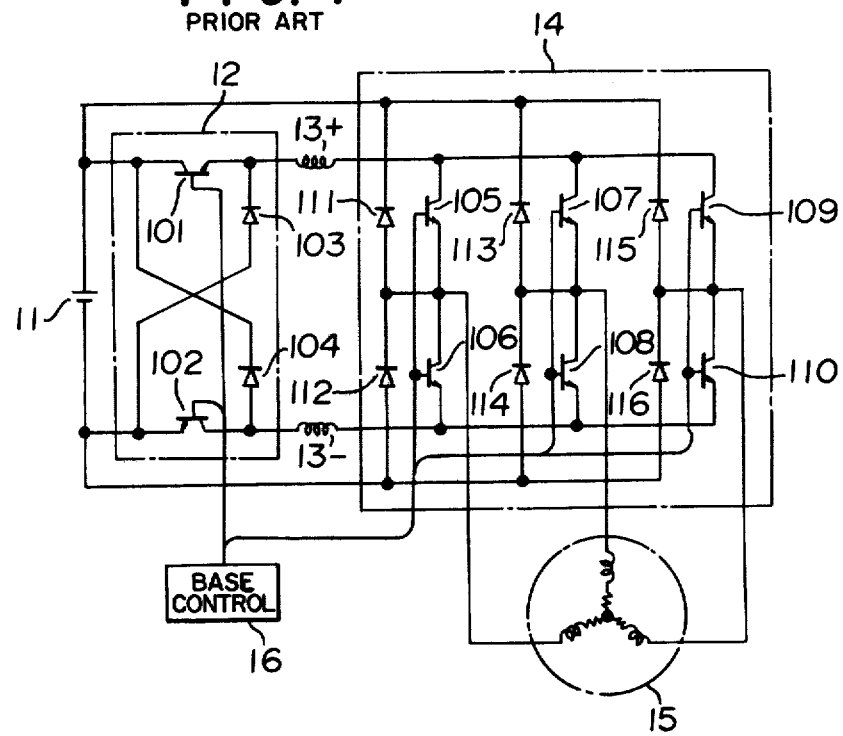
FIG. 4 is a circuit diagram showing the conventional current inverter device.
Figure 5:
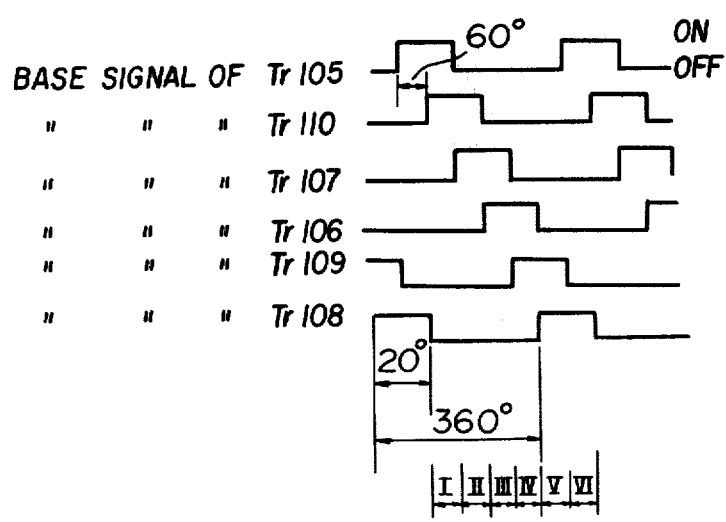
FIG. 5 shows input signal waveform of a base of a transistor for the conventional current type inverter device.

When the load (4) is an induction load, the current passing to the thyristor (2U+) is passed from the diode (3U−) as that of FIG. 2.

When the transistor (6+) is turned off by the input of the gate signal to the thyristor under the timing for turning off the thyristor (2U+), the current passing through the thyristor is turned off. However, there is no trouble because of a short time.

Figure 8:
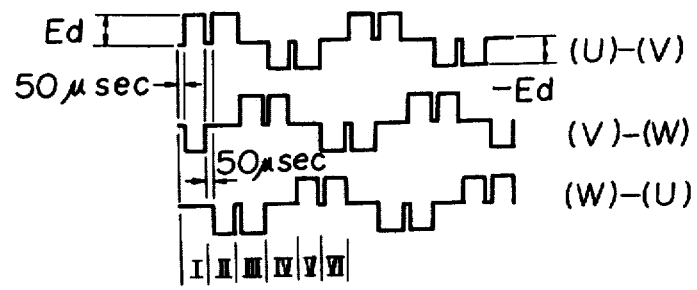
FIG. 8 shows output voltage waveforms of the inverter device according to the present invention.

When the base signal of the transistor (6−) is stopped at the time stopping the gate signal of the thyristor in order to turn off the thyristor (2U−), the voltage of the second DC power source (8) is applied from the positive side to the cathode of the thyristor (2U−) and from the negative side through the resistor (7), the transistor (6+) and the diode (3U+) to the anode of the thyristor (2U−). Thus, when the load is an induction load, the current passing through the thyristor (2U−) is passed to the diode (3U+). When the thyristors (2U+), (2V+), (2W+), (2U−), (2V−), (2W−) and the transistors (6+), (6−) are operated, the voltage shown in FIG. 8 is obtained between the terminals of the load (4). That is, the thyristors (2U+), (2V−), (2W+) and the transistors (6+), (6−) are in ON state, the voltage between the terminal (U)–(V) is "Ed"; the voltage between the terminal (V)–(W) is "−Ed" and the voltage between the terminals (W)–(U) is zero as the period (I) shown in FIG. 7.

However, during the initial 50 μsec., the thyristor (2V−) is substantially in OFF state and the voltages between the terminals (U)–(V); (V)–(W) and (W)–(U) are respectively zero, because the transistor (6−) is in OFF state.

The voltage can be also studied for the time (II)–(VI) shown in FIG. 7 whereby the voltage waveform shown in FIG. 8 can be obtained.

In one embodiment of FIG. 6, a chopper and a gate turn-off thyristor can be used as a switching element instead of the transistors (6+), (6−).

In the embodiment of the FIG. 6, the three phase circuit is shown, it can be a single phase circuit or the other modified circuit.

As described above, in accordance with one embodiment of the present invention, a single transistor is connected to the front of the plurality of thyristors and the reverse voltage is automatically applied to said thyristors and the thyristors are turned off, and accordingly, the number of the expensive thyristors can be reduced and an economical inverter device can be provided, advantageously. The second DC power source (8) for applying the reverse voltage to the thyristor can be a small one and accordingly, cost of the inverter device of the present invention is not increased.

Figure 9:
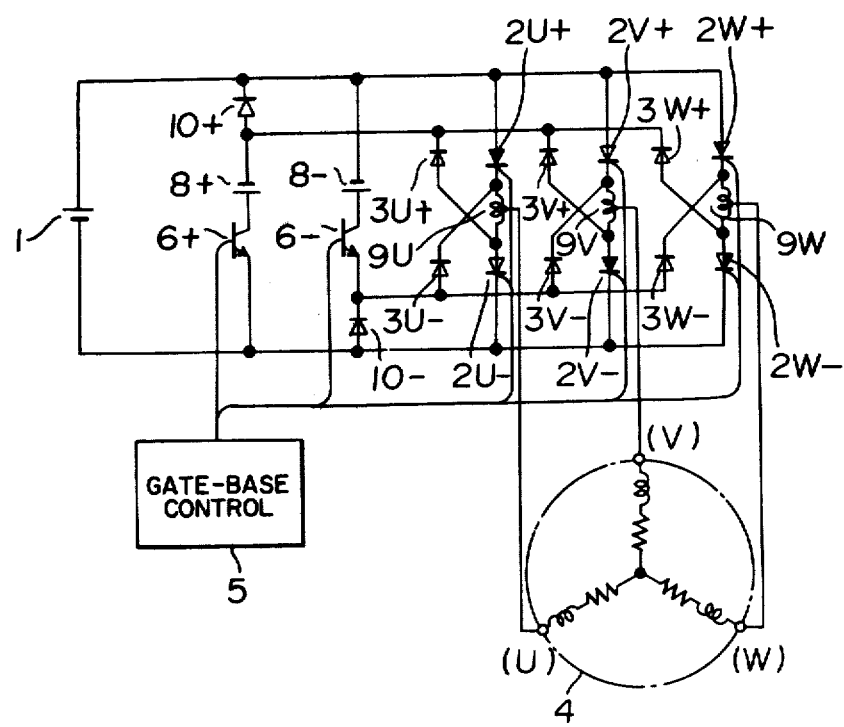
FIG. 9 is a circuit diagram of the other embodiment of the inverter device according to the present invention.

FIG. 9 shows the other embodiment of the present invention wherein the reference (1) designates the first power source for voltage of Ed; (2U+), (2V+), (2W+), (2U−), (2V−), (2W−) designate thyristors; (3U+), (3V+), (3W+), (3U−), (3V−), (3W−) designate diodes; (4) designates a load; (5) designates a gate-base control device; (6+), (6−) designate transistors; (8+), (8−) designate the second DC power source for voltage of Ec; (9U), (9V), (9W) designate reactors; and (10+), (10−) designate diodes.

The thyristors (2U+), the reactor (9U) and the thyristor (2U−); the thyristor (2V+), the reactor (9V) and the thyristor (2V−); and the thyristor (2W+), the reactor (9W) and the thyristor (2W−) are respectively connected in series wherein the current direction is the direction in said arrangement. The positive side of each of the serial connections (anodes of the thyristors (2U+), (2V+), (2W+)) is connected to the positive side of the first DC power source (1) and the negative side (cathode sides of thyristors (2U−), (2V−), (2W−)) is connected to the negative side of the first DC power source (1). In the pairs of the second DC power source (8+) and the transistor (6+) and; the second DC power source (8−) and the transistor (6−), the positive side of the second DC power source (8+) is connected in series to the collector of the transistor (6+) and the positive side of the second DC power source (8−) is connected in series to the collector of the transistor (6−). The negative side of the second DC power source (8+) is connected in series to the anode of the diode (10+). The emitter of the transistor (6−) is connected in series to the cathode of the diode (10−). Moreover, the cathode of the diode (10+) and the negative side of the second DC power source (8−) are connected to the positive side of the first DC power source (1). The emitter of the transistor (6+) and the anode of the diode (10−) are connected to the negative side of the first DC power source (1).

The cathodes of the diodes (3U+), (3V+), (3W+) are respectively connected to the joint between the reactor (9U) and the thyristor (2U−); the joint between the reactor (9V) and the thyristor (2V−); and the joint between the reactor (9W) and the thyristor (2W−). The cathodes of the diodes are connected to the diode (10+) and the second DC power source (8+).

The cathodes of the diodes (3U−), (3V−), (3W−) are respectively connected to the joint between the thyristor (2U+) and the reactor (9U); the joint between the thyristor (2V+) and the reactor (9V); and the joint between the thyristor (2W+) and the reactor (9W). The anodes of the diodes are connected to the joint between the transistor (6−) and the diode (10−). The central points of the reactors (9U), (9V), (9W) are respectively connected to the terminals (U), (V), (W) of the load (4). The gates of the thyristors (2U+), (2V+), (2W+), (2U−), (2V−), (2W−) and the bases of the transistors (6+), (6−) are connected to the gate-base control device (5).

Figure 10:
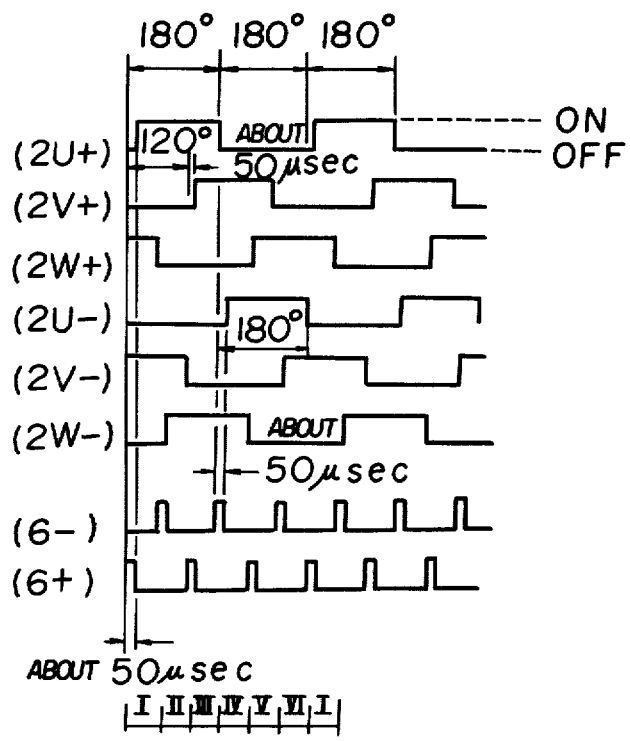
FIG. 10 shows input signal waveforms of a gate of a thyristor and a base of a transistor in the other embodiment of the present invention.

The inverter device of the present invention has the abovementioned structure, and the gate signal or the base signal shown in FIG. 10 is applied to the thyristors (2U+), (2V+), (2W+), (2U−), (2V−), (2W−) and the transistors (6+), (6−). That is, the signals having a shift of 180° C. are respectively input to the thyristors (2U+), (2V+), (2W+) and the signals having a shift of 120° are respectively input to the thyristors (2U+), (2U−); the thyristors (2V+), (2V−); and the thyristors (2W+), (2W−) for the time of about 50 μsec. which is the time for turning on the transistor (6+) or (6−). When one of the gates of the thyristors (2U+), (2V+), (2W+) is extinguished, the base signal is input to the transistor (6−). When one of the gates of the thyristors (2U−), (2V−), (2W−) is extinguished, the base signal is input to the transistor (6+).

The base signal is input to the transistor (6−) for the purpose of turning off the thyristors (2U+), (2V+), (2W+). The base signal is input to the transistor (6+) for the purpose of turning off the thyristors (2U−), (2V−), (2W−).

The operation from the period (I) to the period (II) shown in FIG. 10 is considered.

When the base signal is not input to the transistor (6+) in the period (I), the gate signal is input to the thyristors (2U+), (2W+), (2V−). The terminals (U), (W) of the load (4) is in a potential "Ed" of the first DC power source; and the terminal (V) is in a potential zero of the first DC power source (1). Thus, the reactors (9U), (9V), (9W) are only about several hundreds μH which are smaller than those of the impedance of the load (4). Accordingly, the voltage drop caused by the reactors can be negligible.

In the period (II), the gate signal of the thyristor (2W+) is stopped, and during about initial 50μ seconds, the signals are input to the gate of the thyristors (2U+), (2V−) and the base of the transistor (6−). Accordingly, the potential of the second DC power source (8−) is applied through the transistor (6−) and the diode (3W−) to the thyristor (2W+) as reverse voltage, whereby the thyristor (2W+) is turned off. Thus, the gate of the thyristor (2U+) is input, however, the potential of the second DC power source (8−) is applied through the transistor (6−) and the diode (3U−) as a reverse voltage whereby it is not conductive.

Thus, the second DC power sources (8−), (8+) are to turn off the thyristors (2U+), (2V+), (2W+) whereby it is enough to give several to several tens volts. The potentials of the terminals (U), (V), (W) of the load (4) are as follows.

Potential of terminal (U)=Ed+Ec/2
Potential of terminal (V)=Ed/2+Ec/2
Potential of terminal (W)=Ed+Ec/2

When the base signal of the transistor (6−) is stopped, and the gate signal is input to the thyristors (2U+), (2V−), (2W−), the potential of the terminal (U) of the load (4) is "Ed" and the potentials of the terminals (V), (W) are zero.

Figure 11:
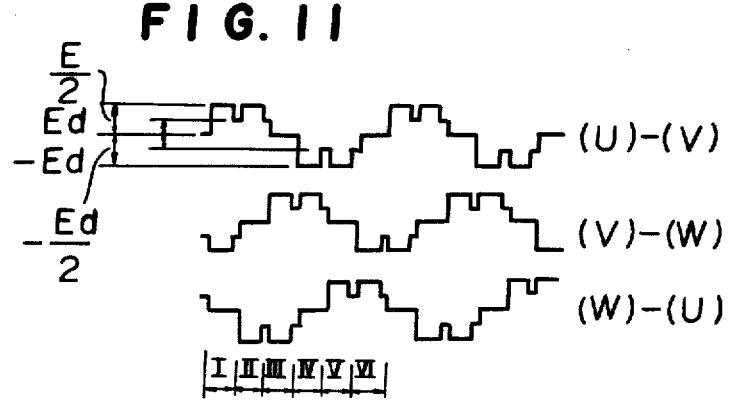
FIG. 11 shows output voltage waveforms in the other embodiment of the present invention.

The potentials between the terminals (U), (V), (W) are shown in FIG. 11.

The gate signal having about 50μ second is input to the transistor (6+) when it is changed from the period (II) to the period (I). The operation is the same with that of the change from the period (I) to the period (II) and is not described again.

As described above, in accordance with the other embodiment, in order to turn off a plurality of the thyristors, the transistor connected in series to the second DC power source and connected in parallel to the thyristors is turned on to apply reverse voltage to said thyristors. The number of the expensive transistors can be reduced in comparison with the conventional inverter device whereby the economical inverter device having accurate operation can be obtained advantageously.

The embodiment of three phase full wave circuit is described and the embodiment can be applied also to a single phase circuit.

As the transistor, the other switching element having ON, OFF function such as gate turn-off thyristor can be used.

Figure 12:
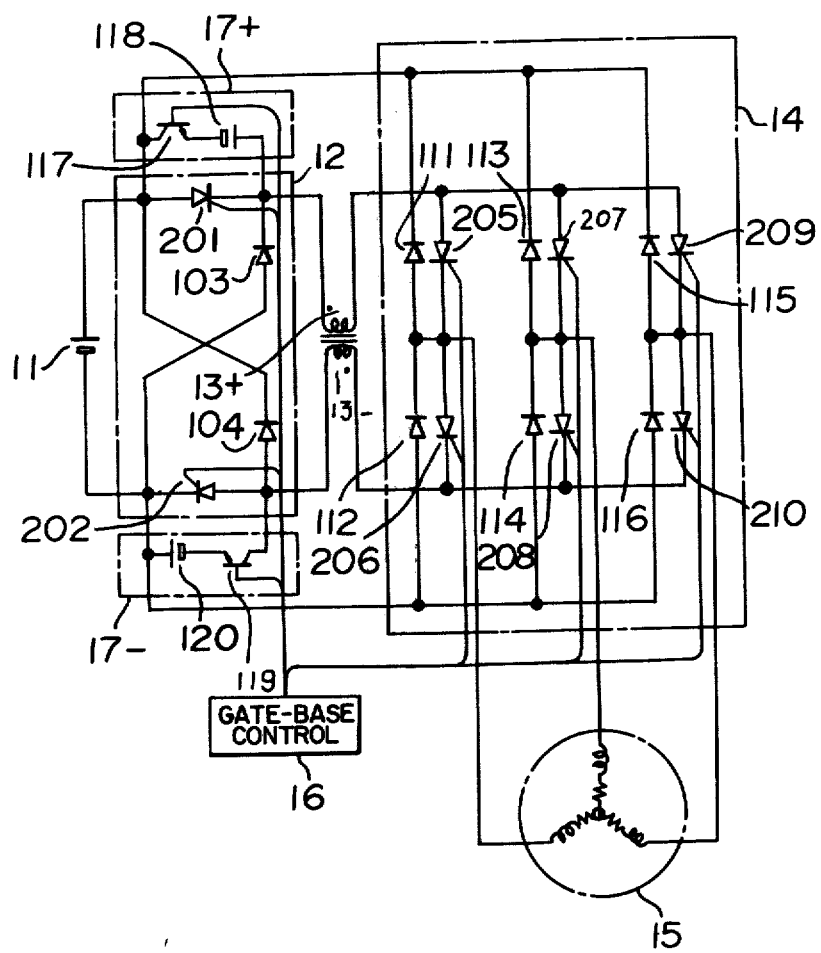
FIG. 12 is a circuit diagram of one embodiment of a current type inverter according to the present invention.

FIG. 12 shows one embodiment of a current type inverter device of the present invention wherein the reference numeral (11) designates a DC power source; (12) designates a chopper connected to the DC power source (11); (13+), (13−) designate DC reactors connected to chopper (12); (14) designates an inverter connected to the DC reactors (13+), (−−−) and the DC power source (11); (15) designates a load connected to an inverter (14). The chopper (12) is formed with thyristors (201), (202) and diodes (103), (104). The inverter (14) is formed with thyristors (205) to (210). The reference (17+), (17−) designate commutation circuits connected in parallel to the thyristors (201), (202) and the commutation circuit (17+) is formed with the transistor (117) and the additional DC power source (118) and (17−) is formed with the transistor (119) and the additional DC power source (120). The reference (16) designates a control part for controlling gates of the thyristors (201), (202) and (205) to (210) and bases of the transistors (117), (119).

The operation will be illustrated.

When the thyristors (201), (202) are turned on by a signal from the control part (16), a power is fed from the DC power source (11) through the thyristors (201), (202) and the DC reactors (13+), (13−) to the inverter (14). When the thyristors (201), (202) are in OFF state, the diodes (103), (104) are turned on whereby the feedback of the power is conducted from the inverter (14), through the DC reactors (13+), (13−) to the DC power source (11). Thus, the chopper (12) controls the power fed from the DC power source (11) through the DC reactors (13+), (13−) to the inverter (14) while turning on and off the thyristors (201), (202). The DC reactors (13+), (13−) operate so as to smoothen the feed of the power. The ON and OFF states of the thyristors (201), (202) are as follows. The thyristors are turned on by applying a signal from the control part (16) to the gates of the thyristors (201), (202). The thyristors are turned off by applying the voltage of the DC power sources (118), (120) in the commutation circuits (17+), (17−) as reverse bias to the thyristors (201), (202) by feeding ON signal from the control part (16) to the transistors (117), (119) of the commutation circuits (17+), (17−) to turn on the transistors.

The time for feeding ON signal to the transistors (117), (119) can be several tensμ second. Thus, when OFF signal is fed to the transistors (117), (119), the thyristors (201), (202) or the transistors (117), (119) are turned off whereby a power feedback circuit having the diodes (103), (104) is formed. The inverter (14) converts DC power fed from the chopper (12) through the DC reactors (13+), (13−) to AC power and feeds the AC power to the load.

In order to operate the inverter (14), the signal shown in FIG. 12 is fed from the control part (16) to the gate of the thyristors (205), (210) and the transistors (117), (119) of the commutation circuits (17+), (17−). This signal is input together with the signal for operating the chopper (12) to the transistors (117), (119).

Figure 13:
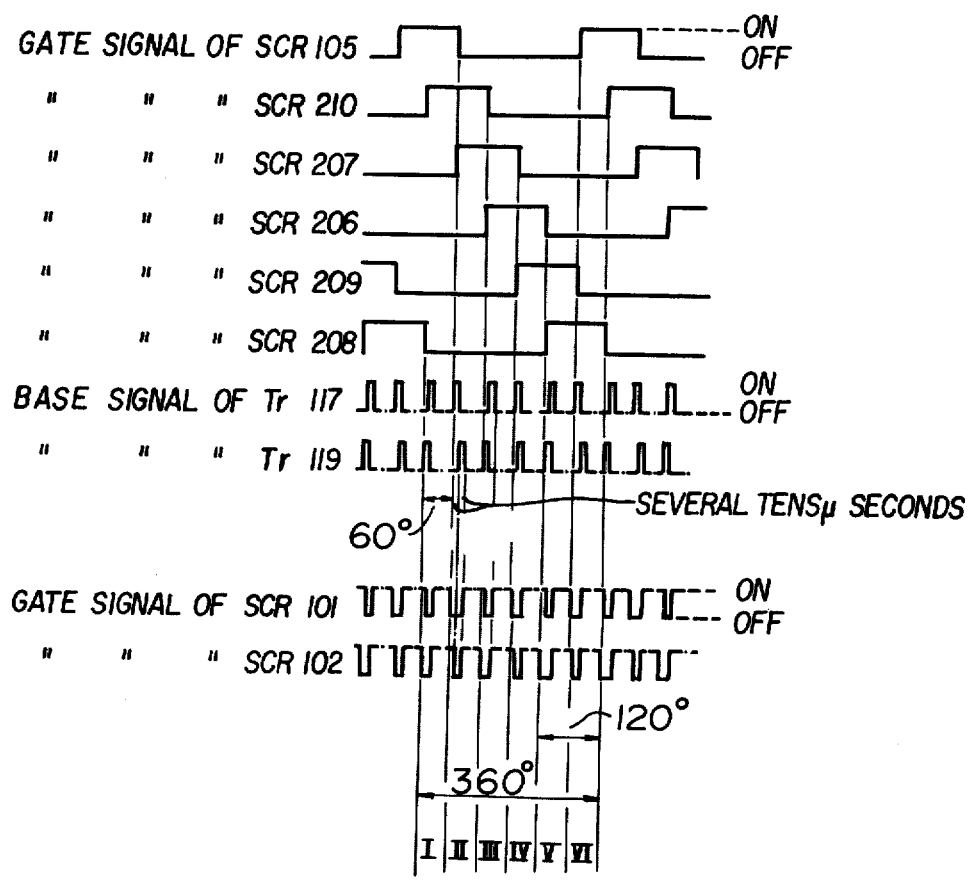
FIG. 13 shows input signal waveforms of a gate of the thyristor for the inverter and a base of the transistor under inverter operation.

In the normal state of the mode (I) in FIG. 13, the thyristors (205), (210) are in ON state and the DC power is fed through the DC reactor (13+), the thyristor (205), the load (15), thyristor (210) and the DC reactor (13−). When it is converted from the mode (I) to the mode (II), ON signal of the gate of the thyristor (205) is stopped and ON signal is fed to the gate of the thyristor (207) and the ON signal is input for several tensμ seconds as shown in FIG. 13 to the bases of the transistors (117), (119). The ON signal is input to the base of the transistor (117) and the OFF signal is input to the gate of the thyristor (201) whereby the thyristor (201) is turned off. Then, the ON signal is input to the base of the transistor (119) and the OFF signal is input to the gate of the thyristor (202) to turn off the thyristor (202). In this state, a loop of the transistor (119), the DC power source (120), the thyristor (210) and the DC reactor (13−) is formed whereby the voltage of the DC power source (120) is formed in the DC reactor (13−). The DC reactors (13−), (13+) are not connected whereby the voltage is induced in the DC reactor (13+). The thyristor (201) is in OFF state in the loop having the DC reactor (13+), and accordingly, the loop of the DC reactor (13+), the diode (103), the diode (112) and the thyristor (205) is formed and the voltage of the DC reactor (13+) is applied as reverse voltage to the diode (103) and the thyristor (205) to turn off the thyristor (205). After turning off the thyristor (205), the turn ON-OFF operation of the thyristors (201), (202) are dependent upon the chopper operation.

When the reactor is included in the load (15), the current passed to the thyristor (205) is changed to pass from the negative side of the DC power source (11) through the diode. The current is gradually reduced whereas the current passing from the DC reactor (13+), through the thyristor (207) to the load (15) is gradually increased. The current passing through the DC reactors (13+), (13−) is substantially kept in constant. When the current passing to the thyristor (207) is not more than the current of the DC reactor (13+), the current is passed through the DC reactor (13+), the thyristor (207) and the thyristor (201) or through the DC reactor (13+), the thyristor (207), the DC power source (11) and the diode (103) depending upon the condition of the chopper (2). The current passing to the thyristor (210) is the same with the conventiona one. When the current passing to the diode (103) is zero, the current passing to the thyristor (207) is the same with the current passing to the DC reactor (13+), the current is passed through the DC reactor (13+), the thyristor (207), the load (15), the thyristor (210) and the DC reactor (13−). This is the normal state in the mode (II). Thus, the thyristors (205) to (210) and the diodes (111) to (116) in the inverter (14) sequentially repeat the operation for turn ON and OFF and the AC power is fed to the load.

In the embodiment of the circuit of the thyristor (201), the transistor (117) and the DC power source (118) or the circuit of the thyristor (202), the transistor (119) and the DC power source (120), it is possible to provide chopper function in the transistors (117), (119) without using the thyristors (201), (202). In this circuit, the thyristors (205), (210) in the inverter (14) can be turned off by alternatively turning off the transistors (117), (119), even though the DC power source (118), (120) are departed from the transistors (117), (119) and connected to the diodes (103), (104) in reverse series.

In accordance with the present invention, in order to turn off a plurality of thyristors in the inverter, a switching element such as a transistor is controlled to turn on and off whereby the reverse voltage is automatically applied to the thyristor and the thyristor is turned on and off and a number of expensive transistors can be reduced to provide an economical inverter device advantageously.

What is claimed is:

1. An inverter device which comprises a plurality of groups of serially connected diodes which are connected in parallel between positive and negative sides of a first DC power source to apply a voltage from said first DC power source; first and second switching elements connected to common terminals of the groups of the serially connected diodes; a resistor and a second DC power source connected in series and being in parallel with said switching elements; a plurality of groups of serially connected thyristors which are connected in parallel to apply a forward voltage from said first DC power source, said thyristors being turned-off by a reverse voltage from said second DC power source; and a load side output terminal as a joint connecting said groups of thyristors and said groups of diodes at the middle point in the serial connection, whereby said thyristors and said switching elements are controlled.

2. An inverter device according to claim 1 wherein said switching element is a transistor.

3. An inverter device according to claim 2 wherein said gates of the thyristors and bases of the transistors are controlled.

4. An inverter device according to claim 1 wherein said switching element is a chopper.

5. An inverter device according to claim 1 wherein said switching element is a gate turn on-off thyristor.

6. An inverter device which comprises a plurality of groups of serially connected thyristors with each group having a reactor in the middle which are connected in parallel between the positive and negative sides of a first DC power source to apply forward voltage from said first DC power source; a plurality of serially connected diodes having said reactors as common elements in middle which are connected in parallel to apply a voltage from said first DC power source; second DC power source means and switching element means connected in series to apply reverse voltage to said groups of thyristors; and a load side output terminal which is at each middle point of said reactor whereby said thyristors and said switching elements are controlled.

7. An inverter device according to claim 6 wherein said switching element is a transistor.

8. An inverter device according to claim 7 wherein the gates of said thyristors and bases of said transistors are controlled.

9. An inverter device according to claim 6 wherein said switching element is a gate turn-off thyristor.

10. A current type inverter device which comprises a DC power source; a chopper connecting one of at least two diodes between an input side of a first switching element and an output side of a second switching element and connecting the other of said at least two diodes between an output side of said first switching element and an input side of said second switching element; said chopper controlling input power from said DC power source and outputting the controlled power; first and second reactors connected to the output sides of said first and said second switching elements; a plurality of groups of serially connected thyristors which are connected in parallel between both of said reactors; a plurality of groups of serially connected diodes which are connected in parallel between the positive and negative terminals of said DC power source; an inverter comprising said thyristors and said diodes which are respectively connected at each middle point in each serial connection as a load side output terminal; additional DC power source means connected in series with said diodes in said chopper for turning-off said first and said second switching elements with a reverse voltage; a third switching element for controlling connection of said additional power source to said first and second reactors in corresponding to said additional power source; and said first and second reactors being connected under inductive relation.

11. A current type inverter device according to claim 10 wherein said chopper comprises a plurality of thyristors having chopper function.

12. A current type inverter device according to claim 11 wherein said additional DC power source is connected in series to said switching element and said serially connected additional power source and switching element is connected in parallel to said thyristors to give a polarity of said additional DC power source to be reverse polarity to said thyristor for said chopper.

13. A current type inverter device according to claim 10, 11 or 12 wherein said third switching element is a transistor.

14. A current type inverter device according to claim 10 wherein said chopper comprises a plurality of transistors having chopper function.

15. A current type inverter device according to claim 14 wherein said additional DC power source is connected in series to the corresponding diode in reverse polarity and said transistor for said chopper has a function as switching element for said additional DC power source.

* * * * *